United States Patent
Abe et al.

(10) Patent No.: US 7,394,615 B2
(45) Date of Patent: Jul. 1, 2008

(54) DISK DEVICE WITH CHARGING FILTER OUTSIDE PIVOTAL RANGE OF HEAD ACTUATOR AND HAVING PROJECTION PLANE OVERLAPPING THE DISK

(75) Inventors: Kanako Abe, Kanagawa (JP); Herman Russell Wendt, San Jose, CA (US); Shingo Tsuda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 393 days.

(21) Appl. No.: 11/071,615

(22) Filed: Mar. 2, 2005

(65) Prior Publication Data

US 2005/0195523 A1 Sep. 8, 2005

(30) Foreign Application Priority Data

Mar. 2, 2004 (JP) ............................. 2004-057329

(51) Int. Cl.
*G11B 33/14* (2006.01)
(52) U.S. Cl. .................................................. 360/97.02
(58) Field of Classification Search ............... 360/97.02
See application file for complete search history.

(56) References Cited

U.S. PATENT DOCUMENTS

| | | | | |
|---|---|---|---|---|
| 4,857,087 A | * | 8/1989 | Bolton et al. | 55/385.6 |
| 5,500,028 A | * | 3/1996 | Iizuka | 55/385.1 |
| 6,238,467 B1 | * | 5/2001 | Azarian et al. | 96/135 |
| 2003/0156351 A1 | * | 8/2003 | Voights et al. | 360/97.02 |
| 2003/0218829 A1 | * | 11/2003 | Hong et al. | 360/97.02 |

FOREIGN PATENT DOCUMENTS

| | | |
|---|---|---|
| JP | 04-111279 | 4/1992 |
| JP | 2001-043657 | 2/2001 |

* cited by examiner

*Primary Examiner*—A. J. Heinz
(74) *Attorney, Agent, or Firm*—Townsend and Townsend and Crew LLP; Darren Gold

(57) ABSTRACT

A rotating disk storage device is provided with a charging filter capable of efficiently removing dust staying in the interior of the device. In one embodiment, a charging filter is disposed below a magnetic disk and on a bottom of a base. The charging filter has plural through holes by forming a fibrous electret filter medium in a pleat shape. The through holes are formed so as to face a flowing direction of air. Dust, which is moving together with the air flow, is polarized and is attracted to the charging filter. The charging filter can collect even very fine particles without causing such problems as clogging and pressure loss. The pleat portion, which forms the through holes, further exhibits an air flow uniforming effect.

18 Claims, 9 Drawing Sheets

(A)

(B)

(A)

(B)

(A)

DISK DEVICE WITH CHARGING FILTER OUTSIDE PIVOTAL RANGE OF HEAD ACTUATOR AND HAVING PROJECTION PLANE OVERLAPPING THE DISK

CROSS-REFERENCES TO RELATED APPLICATIONS

This application claims priority from Japanese Patent Application No. JP2004-057329, filed Mar. 2, 2004, the entire disclosure of which is incorporated herein by reference.

BACKGROUND OF THE INVENTION

The present invention relates to a dust collecting filter housed within a rotating disk storage device such as a magnetic disk drive or an optical disk drive. More particularly, the present invention is concerned with a rotating disk storage device having an electrostatic filter. The electrostatic filter electrostatically sucks dust suspended in an air flow created with rotation of a disk medium, then separates the dust from air, and collects the dust.

In a magnetic disk drive as one of rotating disk storage devices, the recording density rises with an increase in storage capacity and reduction of size. As a result, the spacing between a recording surface and a head is becoming more and more narrow. At the same time, it has become more important to cope with the problem that very fine dust particles adhere to a surface of a magnetic disk and cause head crash. Assembly of the magnetic disk drive is carried out in a clean room held in a clean air environment, but it is difficult to completely prevent dust from staying in the interior of a disk enclosure. Moreover, an accidental contact of the magnetic disk, which is rotating at high speed, with a head slider may cause the generation of new dust.

The disk enclosure permits ingress and egress of a slight amount of air between the interior and the exterior through a breathing filter. The ingress and egress take pressure balance upon occurrence of a pressure difference between the interior and the exterior of the magnetic disk device. However, fine dust particles penetrating the breathing filter may attract each other and grow larger. Therefore, in a conventional magnetic disk drive, a mechanical filter is mainly used for collecting dust present in the interior of the disk enclosure. Further, an electrostatic filter has also been used. FIG. 1 is a plan view of a conventional magnetic disk drive 1 having a mechanical filter. As a magnetic disk 3 rotates in the direction of arrow A, an air flow flowing in the same direction as the rotating direction of the disk is created on a surface of the magnetic disk. A portion of the air flow enters a corner chamber 8 formed at a corner of a disk enclosure. In the corner chamber 8, a mechanical filter 7 is disposed between an island-like wall portion 6 and a side wall of the disk enclosure.

The mechanical filter 7 is formed such that an activated charcoal filter is surrounded with a charging filter. In addition, the charging filter is surrounded with cloth superior in gas permeability such as gauze. While the air flow, which has entered the corner chamber 8, passes through the mechanical filter 7 and moves again toward the magnetic disk 3, the filter 7 collects dust suspended in the air flow. In the mechanical filter, smaller meshes collect dust suspended in the air flow. Therefore, as the filter is used, dust gradually clogs meshes from the surface to the interior of the filter, with consequent increase of pressure loss and decrease of the dust collection efficiency.

In the mechanical filter, the probability of crash of dust particles against the filter becomes higher as the weight per unit area of the filter formed in a fabric shape increases. An appropriate weight per unit area of the filter is selected according to the size of dust particles to be collected. As the weight per unit area of the filter increases, it becomes possible to collect finer dust particles, but the pressure loss increases and the amount of air passing through the filter becomes smaller. Within the disk enclosure, the air flow is produced by the magnetic disk 3, which rotates at a predetermined number of revolutions. Thus, the number of revolutions and radius of the magnetic disk 3, as well as the number of disks stacked determine the flow velocity of the air flow. If the precision of the mechanical filter is enhanced to collect finer dust particles, the weight per unit area of the filter increases and a deficiency in the air flow velocity can occur. Moreover, even if the pressure loss of the filter increases with use of the filter, it is impossible to increase the air flow velocity. The only measure against a decrease of efficiency is the replacement of filter medium. Thus, in the mechanical filter, it is impossible to attain a satisfactory performance.

A method using 90% clean-up time is known as a method for evaluating the performance of a filter used in a magnetic disk drive. The 90% clean-up time means the time required until dust staying in the interior of the disk enclosure is collected on the filter with rotation of the magnetic disk and the amount thereof decreases 90% relative to an initial value. When the magnetic disk drive using the mechanical filter was measured for 90% clean-up time, it turned out that the 90% clean-up time became longer as the product of the number of revolutions and the diameter of the magnetic disk became smaller. Under the condition that the number of revolutions and the diameter of the magnetic disk were fixed, the 90% clean-up time showed an increasing tendency as the number of stacked disks became smaller. From these facts it can be presumed that the number of revolutions and the diameter of the magnetic disk, as well as the number of stacked disks, have a bearing on the total amount of air flowing through the mechanical filter. In the case of a small-sized magnetic disk drive having a small number of magnetic disks stacked and having a small diameter, a satisfactory dust removal may be impossible.

Japanese Patent Laid-open No. 2000-222854 discloses a technique of affixing an electrostatic charge member (sub-liner) such as electret to a liner for keeping clean the surface of a recording medium in a floppy disk drive (floppy is a registered trademark) (see FIG. 2 in the same document). As the electrostatic charge member, fibers are formed into a non-woven cloth shape as an electrostatic charge attraction member that is then constituted in the form of liner to enhance the dust attraction effect.

Japanese Patent Laid-open No. Hei 3-54790 discloses a technique related to an air cleaner for a magnetic disk drive utilizing an electric charging action. Air passing through the air cleaner is provided with a charging section and a dust attracting section. The charging section is disposed on a charging side for electrically charging dust suspended in air into a positive charge or a negative charge. The dust attracting section is disposed on a downstream side of a flow path to attract the dust having been charged to a positive or negative charge. Japanese Patent Laid-open No. Hei 6-60608 discloses a technique wherein a filter having an electric charging property is used in a positioning mechanism of a magnetic disk drive to enhance the dust collection efficiency.

BRIEF SUMMARY OF THE INVENTION

In recent magnetic disk drives, with an increase of the recording density, the floating height of head/slider on a magnetic disk is becoming more and more low, and even extremely fine dust particles can be a cause of head crash. Besides, due consideration is needed also about disturbance of an air flow, which can cause fluttering of a head suspension assembly. As shown above in connection with the background art, the dust collecting performance of the mechanical filter encounters a limit in principle in its application to a small-sized magnetic disk drive of a high recording density. Even in case of applying an electrostatic type filter to a magnetic disk drive, it is necessary to solve various problems at a time. The problems include, for instance, those related to the structure for ensuring a high dust collection efficiency, selection of a mounting space, and preventing of fluttering to the suspension caused by a turbulent flow.

Accordingly, it is a feature of the present invention to provide a rotating disk storage device having a charging filter of a structure capable of efficiently collecting dust staying or generated in the interior of a disk enclosure. It is another feature of the present invention to provide a rotating disk storage device having a dust collecting filter capable of collecting ultra-fine dust particles efficiently. It is a further feature of the present invention to provide a rotating disk storage device having a dust collecting filter exhibiting little secular deterioration in its dust collection efficiency.

It is a still further feature of the present invention to provide a rotating disk storage device having a dust collecting filter without requiring any extra space in the interior of a disk enclosure and without causing a turbulent flow. It is a still further feature of the present invention to provide a rotating disk storage device having a dust collecting filter exhibiting a flow uniforming action for an air flow present in the interior of a disk enclosure. It is a still further feature of the present invention to provide a rotating disk storage device having a dust collecting filter of a simple structure and easy to install.

In a first aspect of the present invention, there is provided a rotating disk storage device including a disk enclosure including a base and a cover, a rotary disk storage medium supported rotatably by a spindle motor mounted to the base, an actuator head suspension assembly with a head carried thereon, the head being adapted to access the rotary disk storage medium, and a charging filter having through holes including a charged filter medium therearound and allowing an air flow to pass therethrough. When an air flow passes through the through holes, the function of an electrostatic filter and a flow uniforming action are exhibited.

It is possible to provide a charging filter by forming through holes including a charged filter medium therearound and allowing an air flow to pass therethrough. The charging filter exhibits high dust collection efficiency when installed in the interior of the rotating disk storage device. The description "including a charged filter medium therearound" means that all of the components of the charging filter, which surround the through holes, may be formed of a charged filter medium. Alternatively, the description means that a portion of the components may be formed of a charged filter medium and the other portion may be formed of an uncharged material. Plural through holes can be formed easily by providing a pleat portion, and the area of contact of the charging filter with the air flow can be enlarged. In the pleat portion, a flow uniforming effect for the air flow is exhibited by an inner surface, which forms through holes, and a valley portion of an outer surface, whereby it is possible to diminish oscillation of head/slider. The pleat portion with use of a fibrous electret filter medium can provide a charging filter having a large charging quantity and high in dust collection efficiency. The pleat portion formed with plural layers can satisfy such demands contrary to each other as a larger charging quantity and a high rigidity. An electret filter medium large in charging quantity is disposed on an outer side, which comes into contact with a large amount of the air flow. In addition, an electret filter medium small in charging quantity but is high in rigidity is disposed on an inner side. In this way, it is possible to effectively satisfy both demands for a large charging quantity and a high rigidity.

If the pleat portion is combined with a liner portion formed of an electret filter medium to form through holes, it is possible to collect dust also in the liner portion. The charging filter can be installed easily into the rotating disk storage device by fixing the liner portion to the base through a double-coated adhesive tape, and a new releasing gas problem is difficult to occur. If the through holes are formed in one stage, it is possible to form through holes of a large section to such an extent as inlets and outlets of through holes are not blocked when cutting a long filter. If the through holes are formed by tube portions, the strength against external forces increases and the handling in assembling stage becomes easier in comparison with the pleat portion.

If the charging filter is attached to the base or the cover, it is no longer required to provide an extra space within the disk enclosure. The volume of the disk enclosure can be decreased in comparison with the conventional art by an amount corresponding to a removed mounting space of the mechanical filter. Consequently, the amount of dust remaining in the assembling stage can be decreased. The charging filter may be disposed in such a manner that the through holes face in a direction perpendicular to a projection plane of a radius of the rotary disk storage medium. The storage medium passes through a longitudinal center of the charging filter. In that case, an air flow created by the storage medium flows smoothly through the through holes. Thus, not only the dust collection efficiency but also the flow uniforming effect is improved. The charging filter may be attached to a side wall of the base. The air flow is fast on the side wall of the base and it is possible to expect high dust collection efficiency. The through holes may be formed by an electretized polymeric film. Since the polymeric film is higher in rigidity than the fibrous filter medium, it is convenient for imparting a high rigidity to the filter.

In a second aspect of the present invention, there is provided a rotating disk storage device including a disk enclosure including a base and a cover, a rotary disk storage medium supported rotatably by a spindle motor mounted to the base, an actuator head suspension assembly with a head carried thereon, the head being adapted to access the rotary disk storage medium, and a charging filter disposed at a position between the rotary disk storage medium and a bottom of the base and deviated from a projection plane of a pivotal range of the actuator head suspension assembly.

It is possible to utilize a dead space effectively by disposing the charging filter at a position between the rotary storage disk medium and the bottom of the base and the position deviated from a projection plane of a pivotal range of the actuator head suspension assembly. Since the height of the charging filter is not restricted by the actuator head suspension assembly, it is possible to increase the area of contact with the air flow.

In a third aspect of the present invention, there is provided a rotating disk storage device including a disk enclosure including a base and a cover, a rotary disk storage medium supported rotatably by a spindle motor mounted to the base, an actuator head suspension assembly with a head carried thereon, the head being adapted to access the rotary disk storage medium, and a charging filter having a filter medium, the filter medium extending from a side wall of the base horizontally in parallel with a surface of the rotary disk storage medium.

Since the filter medium of the charging filter extends from a side wall of the base horizontally in parallel with the surface of the rotary disk storage medium, it is possible to attain both flow uniforming effect and dust collecting effect at the same time. If an electretized film is used as the filter medium, it is not necessary to use any special support member such as a plate because the film is high in rigidity. Moreover, the use of a support plate permits the use of a fibrous electret filter medium large in charging quantity.

According to the present invention, it is possible to provide a rotating disk storage device having a dust collecting filter capable of efficiently collecting dust staying or generated in the interior of a disk enclosure. Moreover, it is possible to provide a rotating disk storage device having a dust collecting filter capable of collecting ultra-fine dust particles efficiently. Further, it is possible to provide a rotating disk storage device having a dust collecting filter little deteriorated secularly in its dust collection efficiency.

It is also possible to provide a rotating disk storage device having a dust collecting filter without requiring any extra space in the interior of a disk enclosure and without causing a turbulent flow. Moreover, it is possible to provide a rotating disk storage device having a dust collecting filter capable of exhibiting a flow uniforming action for an air flow present in the interior of the disk enclosure. It is further possible to provide a rotating disk storage device having a dust collecting filter of a simple structure and easy to install.

DETAILED DESCRIPTION OF THE INVENTION

Description of Magnetic Disk Drive

Figure 1:
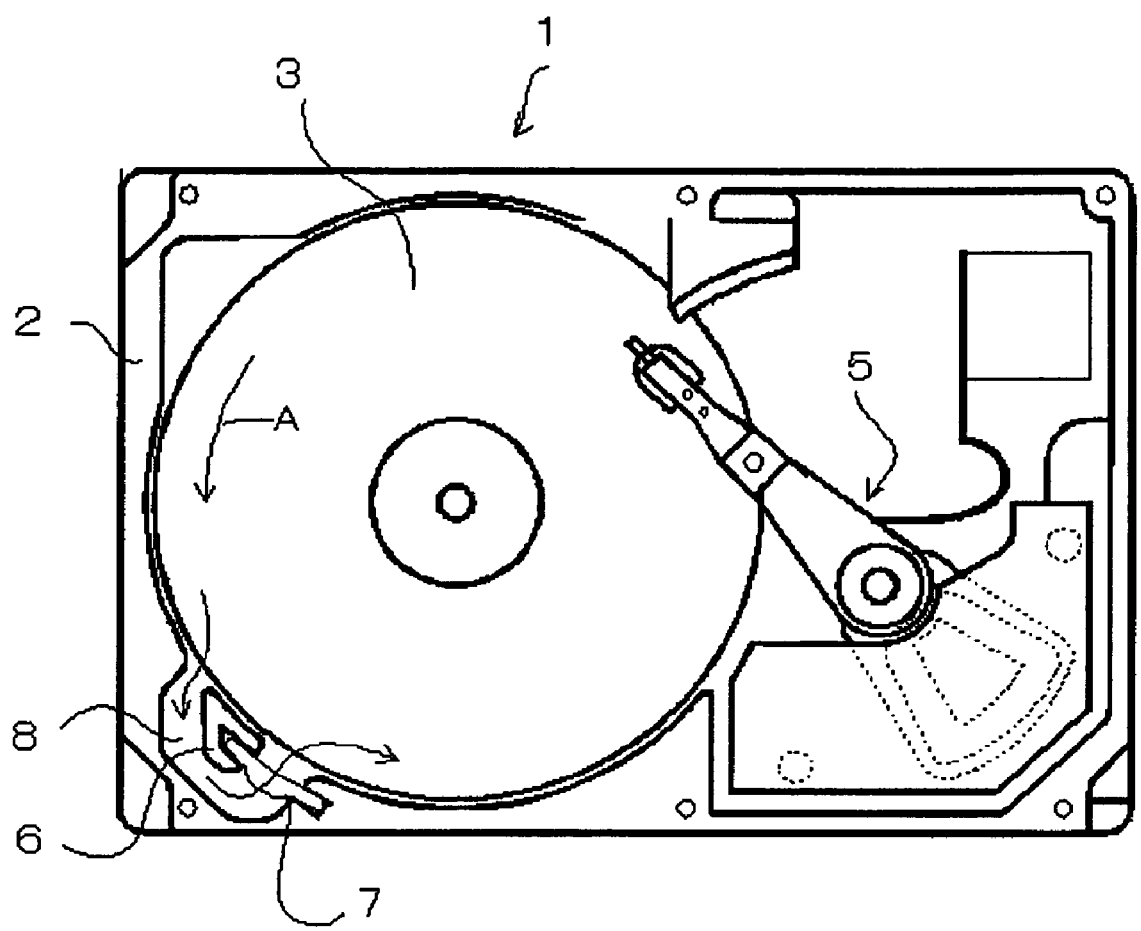
FIG. 1 is a plan view of a magnetic disk drive provided with a mechanical filter.

A rotating disk storage device according to an embodiment of the present invention will now be described with a magnetic disk drive as an example. In this specification and all of the accompanying drawings, the same components are denoted by the same reference numerals. FIGS. 2(A) and 2(B) are plan views illustrating an internal structure of a magnetic disk drive 10. The magnetic disk drive 10 is contoured by a disk enclosure composed of a base 12 and a cover 18. The base 12 includes a bottom 14 to which main components of the magnetic disk drive 10 are attached. The base 12 also includes a side wall 13 providing a joint surface between the base 12 and the cover 18. The base 12 can be formed by subjecting a cold rolled steel sheet to press working or by die casting of aluminum. The cover 18 can be formed by pressing a thin aluminum sheet or a cold rolled steel sheet. In the disk enclosure, the base 12 and the cover 18 are joined together through a gasket (not shown) to form a hermetically sealed space with clean air in the interior. The gasket may be substituted by a sealing tape to seal the disk enclosure hermetically.

A magnetic disk 16 as a rotary disk storage medium is supported by both a spindle motor mounted on a bottom 14 of the base and a spindle hub (see FIG. 3) and is adapted to rotate at high speed around a spindle shaft 25 in the direction of arrow A. A recording layer is formed on at least one face of the magnetic disk 16. A single magnetic disk or a stack of plural magnetic disks can be secured to the hub. In this embodiment, two magnetic disks are stacked. The term "magnetic disk 16" as referred to herein means to include a magnetic disk stack as necessary. Head/slider 22 is composed of a conversion element and a slider. The conversion element performs recording and/or reproduction of data with respect to a recording surface of the magnetic disk 16. An actuator head suspension assembly (hereinafter referred to as "AHSA") 23 includes the head/slider 22, a suspension mechanism, which supports the head/slider 22, and a voice coil motor ("VCM" hereinafter) 24. The AHSA 23 is adapted to pivot about a pivot shaft 26 to move the head/slider 22 up to a predetermined track on the disk 16.

With a range restricted by both outer crash stop 27a and inner crash stop 27b as a pivoting range, the AHSA 23 causes the head/slider 22 to move. The magnetic disk drive 10 is provided with a ramp 21 for allowing the head/slider 22 to be retracted thereto from the surface of the magnetic disk 16 when the rotation of the disk 16 stops. The ramp 21 realizes a load/unload system and being formed in proximity to an outer periphery of the magnetic disk 16. Although this embodiment adopts the load/unload system as a retracting system, the embodiment may adopt a contact start/stop system (CSS). The CSS forms a texture on the surface of the magnetic disk 16 to provide a retraction area. The cover 18 is provided with a breathing filter 28 for preventing the entry of dust from the exterior. The magnetic disk drive 10 is provided with a corner space 15, which is surrounded with a corner of the side wall 13 of the base and the outer periphery of the magnetic disk 16. The corner space 15 is used as a space for measuring the amount of dust in the magnetic disk drive from the exterior through a small hole for counting dust particles. The small hole is formed in the cover 18 at a corresponding position. Below the magnetic disk 16, a charging filter 100 is attached to the bottom 14 of the base.

Figure 2:
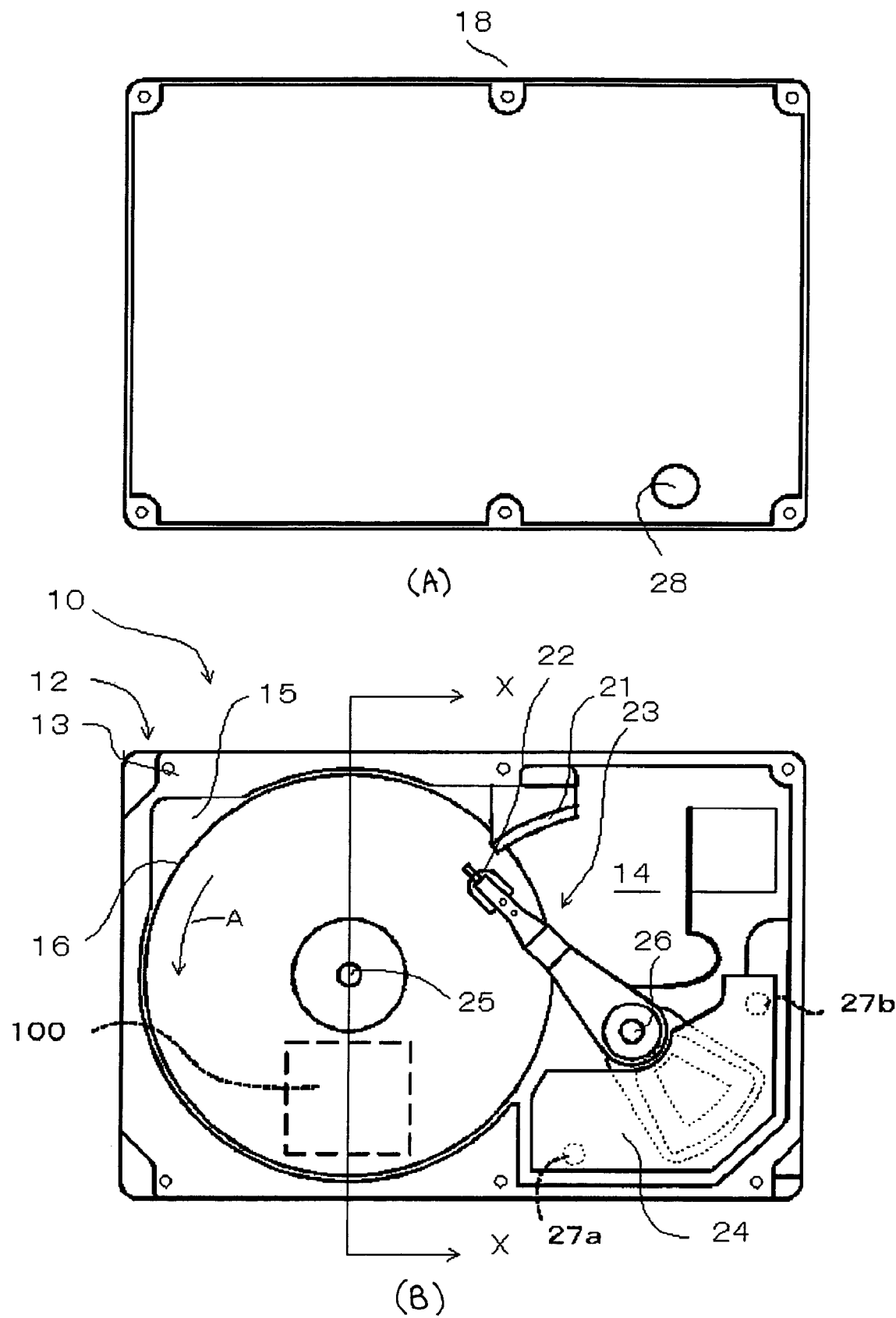
FIGS. 2A and 2(B) are plan views illustrating an internal structure of a magnetic disk drive according to an embodiment of the present invention.
Figure 3:
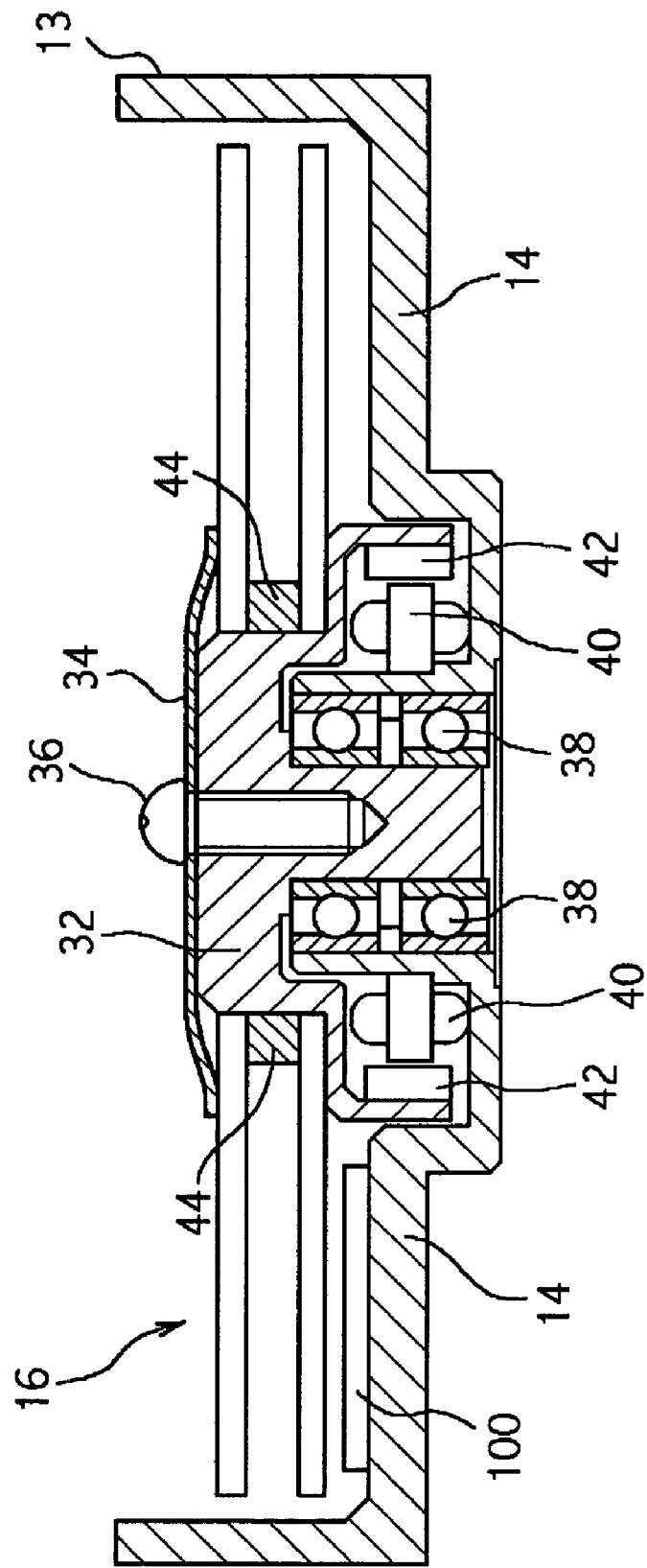
FIG. 3 is a sectional view taken on line X-X in FIG. 2(B).

FIG. 3 is a sectional view taken on line X-X in FIG. 2(B). Two magnetic disks 16 are secured to a spindle hub 32 while being spaced a predetermined distance from each other through a spacer 44. A clamp 34 fixes the magnetic disks 16, which is stacked, to the spindle hub 32 with a set-screw 36. The spindle hub 32 is rotated inside bearings 38 by means of a stator 40 and a rotor magnet 42. Below the magnetic disk 16 located on the lower side, the charging filter 100 is mounted to the bottom 14 of the base. The charging filter 100 is formed using an electret filter medium. Next, a generation description of the electret filter medium will be given below.

Description of Electret Filter Medium

The charging filter 100 is formed using an electretized fibrous filter. The filter medium using electretized fibers is designated an electret filter medium. The electret means that a polymeric material having a high electric insulating property is subjected to molding under the application of a high DC voltage. Then, the polymeric material subjected to molding is polarized semipermanently into a state bearing static electricity constantly. The polymeric material is such as a polyolefin typical of which is polyethylene or polypropylene, Teflon, or Mylar, (Teflon and Mylar are registered trademarks of DuPont Co.). One of two faces of each electretized fiber is polarized positively and the other polarized negatively. The dust present in the interior of the magnetic disk drive is generally electrically neutral. However, the dust undergoes dielectric polarization as the dust approaches the surface of the electret filter medium. Dielectric polarization is a phenomenon such that both positive and negative electric charges appear spacedly from each other within one and same fine particles under the influence of the nearby electric charges on the dust particles, which are electrically neutral.

The electret filter medium induces dielectric polarization in the dust particles, which are electrically neutral, and the dust particles can be attracted against the air flow by virtue of an inducing force such that electric charges of different polarities attract each other. In the case where the dust particles are charged positive or negative, the electret filter medium attracts the dust particles by virtue of Coulomb force. Thus, in the case where the filter fibers are electretized, the amount of dust collected is larger than in case of adopting only the mechanical filtration principle. Taking note of such a characteristic of the electret filter medium, the charging filter according to this embodiment is constructed so as to function appropriately as a dust collecting filter in the magnetic disk drive.

Description of Charging Filter

Figure 4:
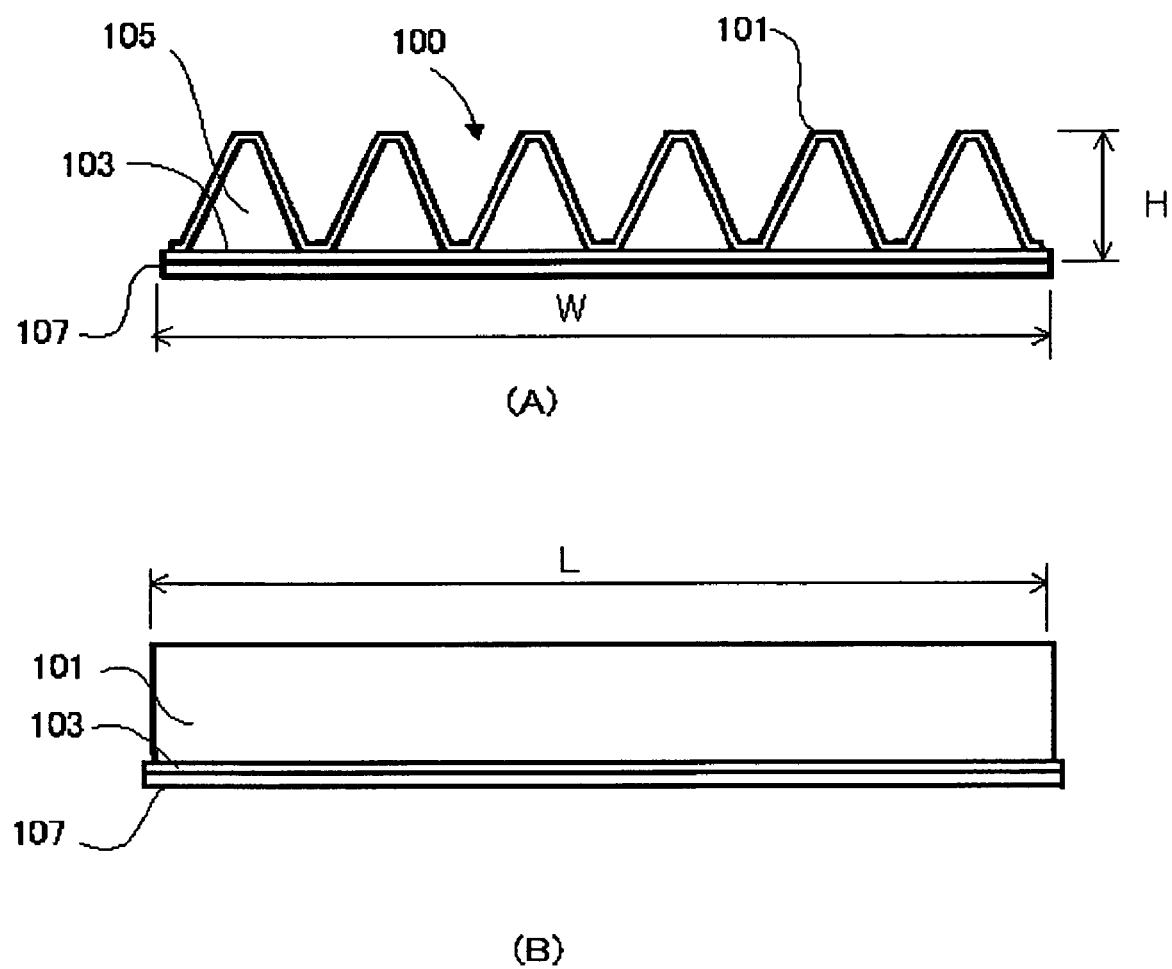
FIGS. 4(A) and 4(B) are perspective views of a charging filter 100 shown in FIG. 2.

FIGS. 4(A) and 4(B) are a front view and a side view, respectively, showing an external form of the charging filter 100 using the electret filter medium. The contraction scale is ignored for the convenience of explanation. The charging filter 100 includes a pleat portion 101 formed by an electretized non-woven fabric and a sheet-like liner portion 103 also formed by an electretized non-woven fabric. The electret filter medium is formed of synthetic polyolefin fibers. Such medium is available, for example, under the trade name of Elitolon (a registered trademark) from Toyobo Co., Ltd. The pleat portion 101 is formed by regularly folding a sheet-like electret filter medium. As shown in FIG. 4(A), the pleat portion 101 is formed in a folded plate shape on cross section. Further, the pleat portion 101 may be formed in any other shape, e.g., a corrugated plate or deck plate shape having a honeycomb structure in which a large number of through holes 105 are formed in width L direction.

Figure 10:
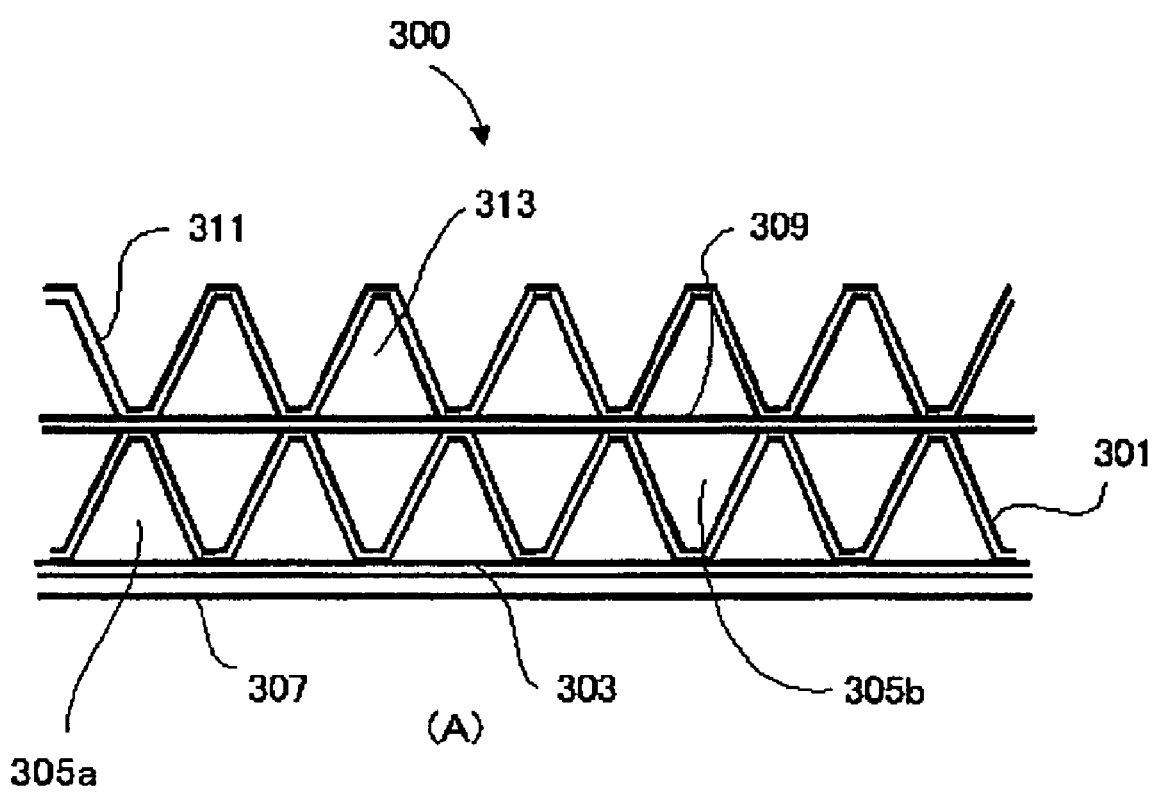
FIG. 10 is a sectional view of a charging filter according to a still further embodiment of the present invention.

The pleat portion 101 has plural through holes 105, which serve as air flow passages in length L direction. In the pleat portion 101, an inner surface side in contact with the through holes 105 and an outer surface side located outside the through holes 105 are both electrically charged. It is preferable that the liner portion 103 be electrically charged on its face contacting the through holes 105 to enhance the dust collection efficiency. However, it may be formed of an uncharged material such as polyethylene terephthalate (PET) or paper in order to enhance the adhesion thereof to a double-coated adhesive tape 107. Further, without provision of the liner portion 103, the pleat portion 101 may be bonded directly to the double-coated adhesive tape 107 to form the through holes 105. The through holes 105 formed in the pleat portion 101 are arranged in a vertically one-stage structure to ensure a predetermined constant strength even in the use of an electret filter medium low in rigidity and large in charging quantity. A multi-stage honeycomb structure may be adopted if required charging quantity and strength are ensured. FIG. 10 shows an example of a charging filter of a multi-stage honeycomb structure. A charging filter 300 shown in FIG. 10 has a two-stage honeycomb structure as an example of a multi-stage structure. The structures of a pleat portion 301, a liner portion 303, through holes 305a, and a double-coated adhesive tape 307 are the same as in the charging filter 100 shown in FIG. 4(A). In the charging filter 300, however, a liner portion 309 is provided on top of the pleat portion 301 and a pleat portion 311 is formed thereon to form through holes 305b and 313. As a result, faces forming the through holes 305a, 305b and 313, as well as an outer surface of the pleat portion 311, mainly collect dust. By thus stacking pleat portions vertically to provide a two- or more-stage honeycomb structure, it is possible to increase the dust collection area. The shape of through holes is not limited to the one shown in FIG. 10. Taking strength and dust collection area into account, a suitable one may be selected from among various shapes. The shapes include including a honeycomb shape and an arrangement of cylinders of a circular section. In FIG. 4(A), the pleat portion 101 and the liner portion 103 are bonded together by fusion-bonding for example. The height H from the bottom of the liner portion 103 to the top of the pleat portion 101 is selected to a value in the range of about 0.8 to 0.35 mm. It may be selected suitably depending on the spacing between the magnetic disk 16 and the bottom 14 of the base.

The double-coated adhesive tape 107 is affixed to the bottom of the liner portion 103 to fix the charging filter 100 to the bottom 14 of the base. If an adhesive is used for fixing the liner portion 103, it is necessary to remove gas released from the adhesive. The use of the double-coated adhesive tape 107 is superior in this point and permits installation of the charging filter. The double-coated adhesive tape 107 may be substituted by an adhesive releasing little gas to fix the charging filter 100.

Description of Charging Filter Installing Position

Figure 5:
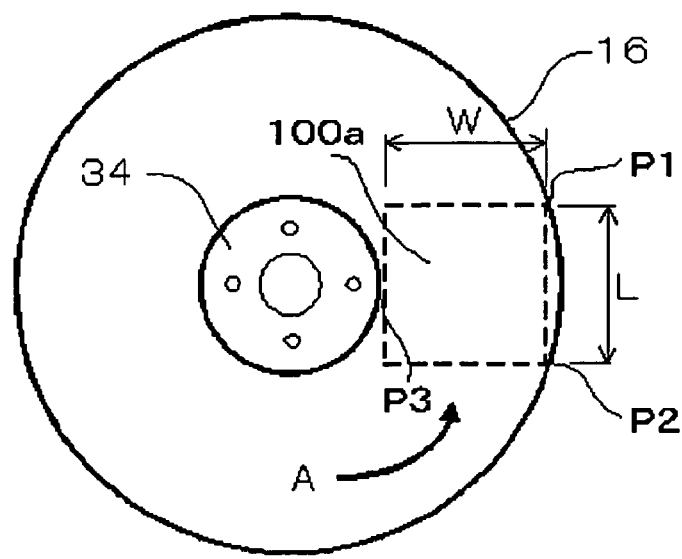
FIGS. 5(A) and 5(B) illustrate the length L and width W of the charging filter 100 and the position thereof on a bottom 14 of a base relative to a magnetic disk 16.
Figure 5:
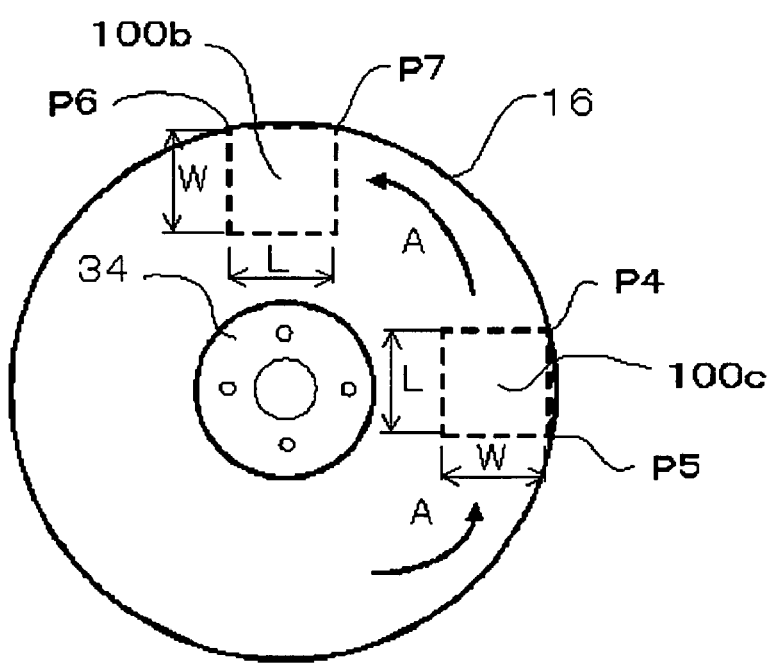

A charging filter installing position will now be described with reference to FIGS. 5(A) and 5(B). In a charging filter 100a shown in FIG. 5(A), only the width W and length L are specified relative to the charging filter 100 shown in FIGS. 4(A) and 4(B). The other structure is the same as the filter 100. In this state the charging filter 100a is secured to the bottom 14 of the base. The charging filter 100a is formed in a square external shape having equal width W and length L. In addition, the filter 100a is disposed in such a manner that a projection plane of a radius of the magnetic disk 16 passing through the center in the length L direction is orthogonal to through holes 105 in the charging filter 100a. The projection plane of the charging filter 100a contacts the outer periphery of the magnetic disk 16 at points P1 and P2 and contacts the outer periphery of the clamp 34 at point P3.

If the charging filter 100a is disposed as above, the direction of the air flow indicated with arrow A, which is moving in the rotational direction of the magnetic disk 16, and the extending direction of the through holes 105 are almost coincident with each other. Consequently, the air flow efficiently passes the outer surface of the pleat portion 101 and the inner surface thereof, which is in contact with the through holes 105, while contacting those surfaces. Thus, the area of contact between the air flow and the electret filter medium can be enlarged and it is possible to enhance the dust collection efficiency. Since the charging filter 100a is a fibrous filter, a slight amount of air flow passes through fiber gaps of the electret filter medium, which constitute the pleat portion 101 and the liner portion 103.

The dust contained in the air flow passing through the fiber gaps of the electret filter medium is collected under two actions. One of the actions is based on a mechanical principle such that the dust strikes against the fibers of the electret filter medium and is collected thereby. The other is based on an electrostatic principle such that the dust passing through the fiber gaps is attracted and collected by electrically charged fibers. Therefore, the dust collection efficiency for the air flow passing through the fiber gaps is higher than that of an uncharged filter. In the charging filter 100, the great part of the air flow moves along both inner and outer surfaces of the plural, parallel through holes 105, which are outside portions of the fibers. As a result, the problem of deterioration in dust collection efficiency caused by a pressure loss scarcely occurs from the beginning. Even if the electret filter medium repeats the collection of dust secularly, it is possible to solve the problem that has been encountered in the mechanical filter. The problem is, for example, an increase of pressure loss and a decrease in efficiency.

If the length L of the charging filter 100 is too long, the air does not flow smoothly through the valley portions between the through holes 105 and the pleat portion 101. The dust collection efficiency is deteriorated. If the length L is too short, the surface area of the charging filter 100 decreases, thus also leading to a lowering of the duct collection efficiency. The most efficient is to adopt a square plane contour like the charging filter 100a shown in FIG. 5(A). Two or more charging filters 100 may be provided on the bottom 14 of the base, as indicated at 100b and 100c in FIG. 5(B). The charging filter 100 may be formed smaller than 100a, like 100b and 100c in FIG. 5(B), for some reason in processing or in mounting of the electret filter medium. Even in that case, it is recommended that a plane contour be defined in a square shape. Furthermore, a projection plane of the contour is in contact with the outer periphery of the magnetic disk 16 at points P4 to P7. This is because the magnetic disk 16 is higher in peripheral velocity as compared with inner velocity. Therefore, the velocity of the air flow on its outer periphery side is higher, and the dust collection efficiency can be enhanced.

Referring now to FIG. 2(B), the charging filter 100 is mounted to the bottom 14 of the base at a position deviated planarly from the pivoting range of the AHSA 23. When a recording surface is provided also on the bottom 14 side of the base with respect to the magnetic disk 16, a space for the AHSA 23 is needed between the magnetic disk 16 and the bottom 14. In that case, it is impossible to ensure a sufficient height of the charging filter 100. Therefore, the position shown in FIG. 2 is convenient. An air flow created on the surface of the magnetic disk 16 strikes against an actuator arm and a head suspension assembly in the AHSA 23 and is disturbed. The disturbance of the air flow causes an irregular oscillation of the head/slider 22 and causes deterioration of the positioning performance. However, the charging filter 100 has the through holes 105 formed by the pleat portion 101 and the outer surface including crest and valley portions. The turbulent air flow is made uniform in the direction of the through holes 105 while passing the through holes 105 and the outer surface. As a result, an effect of suppressing the turbulent flow is obtained.

Heretofore, the space between the lowest-stage magnetic disk 16 and the bottom of the base 12 has been a dead space. Since the charging filter 100 utilizes this dead space, as shown in FIG. 1, it is possible to remove the corner chamber 8 formed at a corner of the base for the filter. The removal of the chamber 8 decreases the entire volume of the enclosure. Once the volume of the disk enclosure is decreased, the amount of dust staying in the interior of the magnetic disk drive 10 can be decreased in the assembling stage. Furthermore, because the shape of the portion corresponding the corner chamber 8 becomes simpler, the fabrication of a mold is convenient. It is also possible to prevent disturbance of the air flow caused by a change in flow path sectional area by removing the corner chamber 8. A 90% clean-up time is measured using the charging filter 100a. In that case, it is possible to attain a decrease of about 80% and a shortening to 20% in a magnetic disk drive having one magnetic disk in comparison with the conventional counterpart. Thus, it turned out that an outstanding effect could be obtained in a magnetic disk drive small in the number of magnetic disk and hence small in the amount of movement of an air flow.

Although reference has been made to an example in which the charging filter 100 is disposed on the bottom of the base 12, it may be disposed inside the cover 18 and on the side wall 13 of the corner space 15 shown in FIG. 2(B). In the case where the charging filter 100 is disposed inside the cover 18, it is preferable to dispose the filter in such size and position as satisfy the relation explained above in connection with FIGS. 5(A) and 5(B) with respect to a projection plane of the magnetic disk 16. The charging filter 100 may be disposed in any two or all places selected from the bottom 14 of the base, side wall 13 of the base, and the cover 18.

Figure 9:
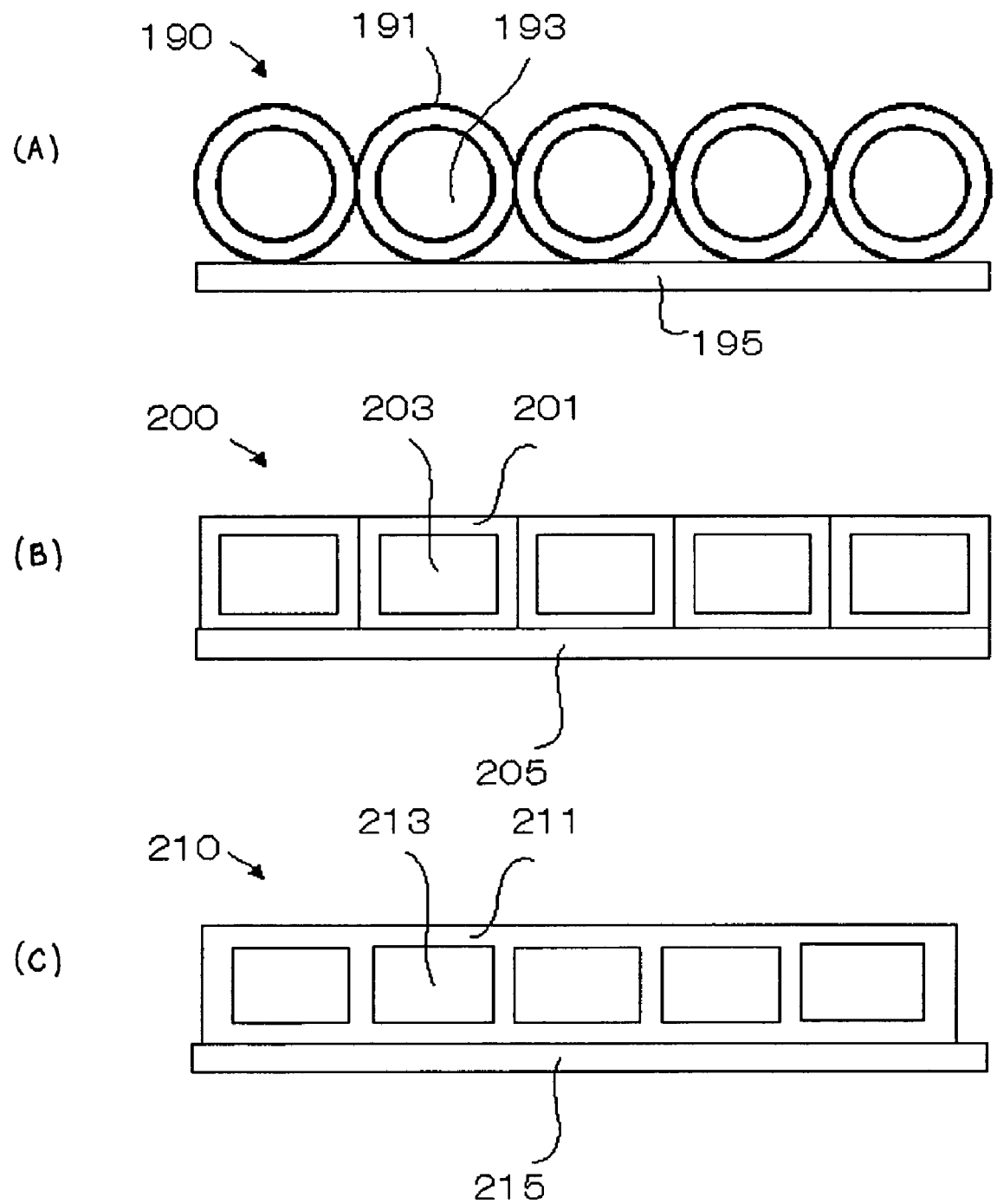
FIGS. 9(A) through 9(C) are sectional views of a charging filter according to a still further embodiment of the present invention.

As shown in FIG. 9(A), the pleat portion, which forms the through holes 105 in the charging filter 100, may adopt the construction of a charging filter 190. The filter 190 arranges tube portions formed of plural hollow cylinders 191 with use of the fibrous electret filter medium on a liner portion 195 to form plural through holes 193. Alternatively, the pleat portion may adopt the construction of a charging filter 200. As shown in FIG. 9(B), the filter 200 arranges tube portions formed of plural hollow quadratic cylinders 201 with use of the fibrous electret filter medium on a liner portion 205 to form plural through holes 203. Such hollow cylinders and quadratic tubes are morphologically stable to external forces in comparison with a corrugated plate shape and deck plate shape. In particularly in case of adopting an electret filter medium large in charging quantity and low in rigidity, it is possible to carry out a handling work easily in the manufacturing stage. As shown in FIG. 9(C), as in a charging filter 210, a tube portion 211 may be formed on a liner 215 with use of a continuous electret filter medium to form plural through holes 213. In the charging filters 190, 200, and 210, the tube portions may be stacked in two or more stages to provide a honeycomb structure.

Description of Dust Collection Using Charging Filter

Figure 6:
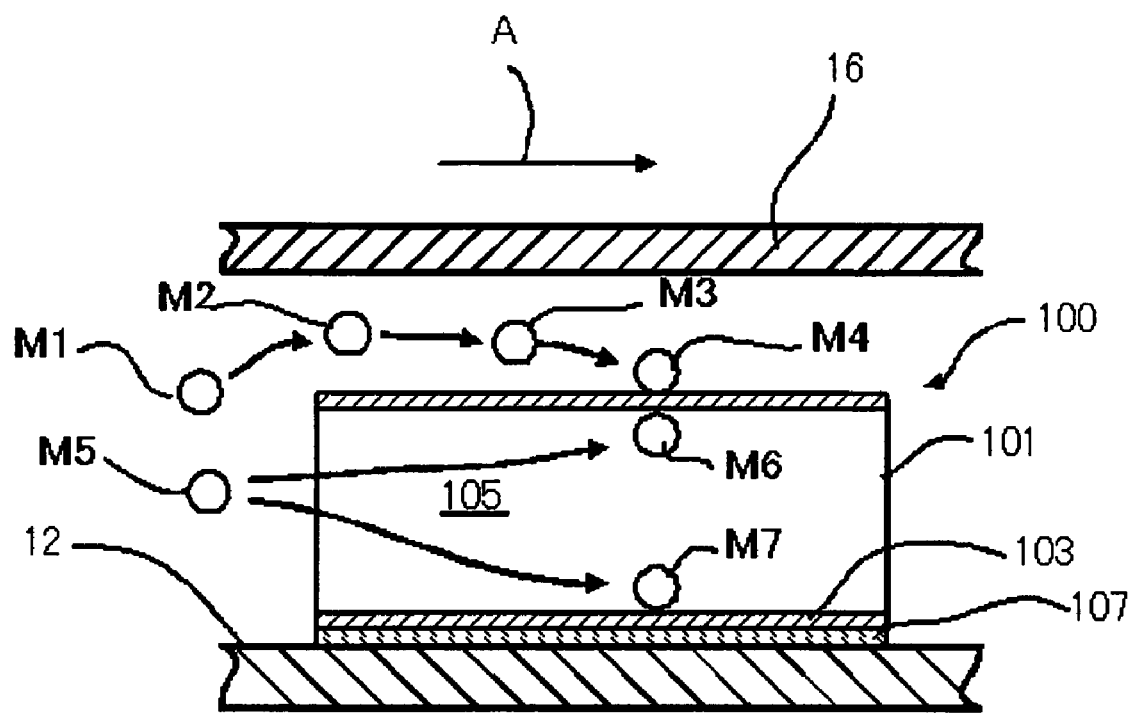
FIG. 6 illustrates in what state the charging filter 100 collects dust, which is moving while floating together with an air flow.

FIG. 6 illustrates in what state the charging filter 100 collects dust, which is moving while floating together with an air flow. The surface of the electret filter medium of the pleat portion 101 and that of the liner portion 103 are electretized. In the pleat portion 101, its inner surface in contact with the through holes 105 and its outer surface in proximity to the magnetic disk 16 are electrically charged. The surface of the liner portion 103 in contact with the through holes 105 is also electrically charged. As the magnetic disk 16 rotates in the direction of arrow A, an air flow in the direction of arrow A is created also within the disk enclosure. Fine dust particles suspended in the air flow move together with the air flow successively in order of positions M1, M2, M3, and M4.

The dust particles are shown in a larger size than their actual size for the convenience of explanation. The actual size is about 0.3 μm. The dust particles penetrate the interior of an electret filter medium formed of fibers about 1 to 70 μm in thickness. Dust particles are usually electrically neutral. At position M1, dust particles are spaced from the charging filter 100, so that dielectric polarization does not occur. At position M2, dust particles approach the charged pleat portion 101, so that dielectric polarization slightly occurs and the dust particles undergo an attractive force from the pleat portion 101. However, the dust particles rise a little with a rise of the air flow caused by collision with the section of the pleat portion 101. The dust particles continue to undergo the attractive force in the area from near the position M2 up to position M3. Therefore, the particles deviate from the air flow and move toward the surface of the pleat portion 101. In this way the dust particles adhere to the outer surface of the pleat portion at position M4. On the surface of the electret filter medium fabricated by knitting fibers, one and the opposite side of the fibers are charged positive and negative, respectively. As a result, the electric charging appears to be neutralized macroscopically. However, from the relation between the size of dust particles and the thickness of fibers, the fibers microscopically exhibit an attracting action for the dust particles in the respective polarities. Thus, even when a dust particle charged in either polarity approaches the electret filter medium, the filter medium can attract the dust particle by virtue of Coulomb force.

An increase of air resistance resulting from installation of the charging filter 100 is to such an extent as is caused by a change in the air flow and is extremely small. This change in the air flow is caused by narrowing in sectional area of the flow path formed by the magnetic disk 16 and the bottom of the base 12. The narrowing corresponds to the total thickness of the pleat portion 101, the liner portion 103, and the double-coated adhesive tape 107. Dust particles that have entered the through holes 105 from position M5 adhere to the inner surface of the pleat portion 101 at position M6 or adhere to the surface of the liner portion 103 at position M7. The dust particles thus adhered to the pleat portion 101 or the liner portion 103 retain their polarized state on the surface of the electret filter medium and never leave the same surface. In addition, the polarized dust particles themselves function as a charging filter for the next coming dust particles. For that reason, the dust collection efficiency is little deteriorated even with use of the charging filter unlike the mechanical filter.

The attractive dust collecting ability based on an electrostatic force is not greatly deteriorated even against dust particles of submicron to nanometer level. The submicron to nanometer level in a mechanical filter causes clogging and resultant deterioration of the filtering capacity. Therefore, fine dust particles, which affect a floating height of ten nanometers or so of head/slider in the interior of the magnetic disk drive, can be collected efficiently over a long period. If the weight per unit area of a mechanical filter is increased in an effort to enhance the dust collection efficiency of the filter, a pressure loss increases. In addition, the amount of air passing through the interior decreases, resulting in that the 90% clean-up time becomes longer. On the other hand, making an issue of pressure loss is not necessary in the charging filter.

Description of Charging Filter Having Stacked Structure

Figure 7:
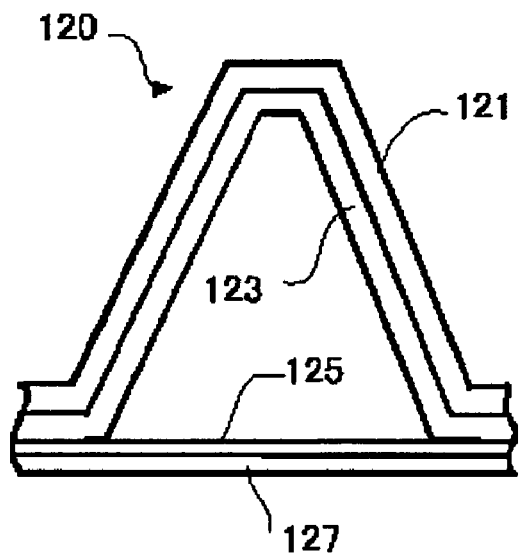
FIG. 7 is a sectional view of a charging filter according to another embodiment of the present invention.

FIG. 7 shows a section of a charging filter 120 according to another embodiment of the present invention. The charging filter 120 shown in FIG. 7 includes a pleat portion of a two-layer structure comprising an outer pleat portion 121 and an inner pleat portion 123. The outer pleat portion 121 and the inner pleat portion 123 are formed using fibrous electret filter media different in fiber charging quantity and rigidity. The charging filter 100 shown in FIGS. 4(A) and 4(B) is fabricated in such a manner that the pleat portion 101 and the liner portion 103 are fusion-bonded together to be continuous long in the length L direction. Then, the filter is cut into an appropriate length L for use. In the cutting operation, if the rigidity of the pleat portion 101 is low, the inlet and outlet of each through hole are blocked, giving rise to the problem that air does not flow in the through holes. On the other hand, some electret filter media have such a characteristic that rigidity and charging quantity are contrary to each other.

That is, there is a filter medium that is high in rigidity and small in charging quantity or a filter medium that is low in rigidity and large in charging quantity. Thus, sometimes, satisfying both required rigidity and charging quantity are difficult by one type of an electret filter medium. In the charging filter 120, such filter media are combined to constitute a composite filter medium, thereby solving the problem associated with rigidity and charging quantity. The outer pleat portion 121 is formed of an electret filter medium low in rigidity but larger in charging quantity. Such medium is available, for example, as Elitolon NA type (a product of Toyobo Co., Ltd.). Its charging quantity is 10 to 20 nC per unit square centimeter. The inner pleat portion 123 is formed of an electret filter medium high in rigidity but small in charging quantity. Such medium is available, for example, as Elitolon AA type (a product of Toyobo Co., Ltd.). Its charging quantity is 0.5 to 1 nC per unit square centimeter. The combination of electret filter media is not limited to this example. An appropriate combination may be selected according to the priority of various parameters including dust collection efficiency, rigidity, and fluff quantity. The combination may also be selected according to the space between the magnetic disk 16 and the bottom 14 of the base. The outside of the charging filter 120 is close to the surface of the magnetic disk 16 and is high in the velocity of the air flow. The dust collection efficiency can be improved by stacking electret filter media large in charging quantity. The outer pleat portion 121 and the inner pleat portion 123 are bonded together by fusion bonding for example.

The liner portion is formed by a stack of an electret filter medium 125 and a lining material 127. The lining material 127 uses reinforced paper or polyethylene terephthalate (PET) to strengthen the adhesion to the double-coated adhesive tape. The electret filter medium 125 and the lining material 127 are bonded together by fusion bonding for example. In the charging filter 120, the pleat portion and the liner portion are each constituted by a composite material. Alternatively, one may be formed using a composite material and the other may be formed using a single material. Further, although the pleat portion is constituted by two layers, it may have a three-layer structure. The three-layer structure has outer and inner surfaces both formed of an electret filter medium large in charging quantity and the middle layer formed using a rigid material. In this case, it is not always necessary that the middle layer be formed of a charged material. Although the charging filter has been described above with a fibrous electret filter medium as an example, the scope of the present invention includes using other materials. The other materials may be an electretized polymeric film and a material charged permanently by any other method than the electretizing method.

Description of Charging Filter Having Cantilevered Structure

Figure 8:
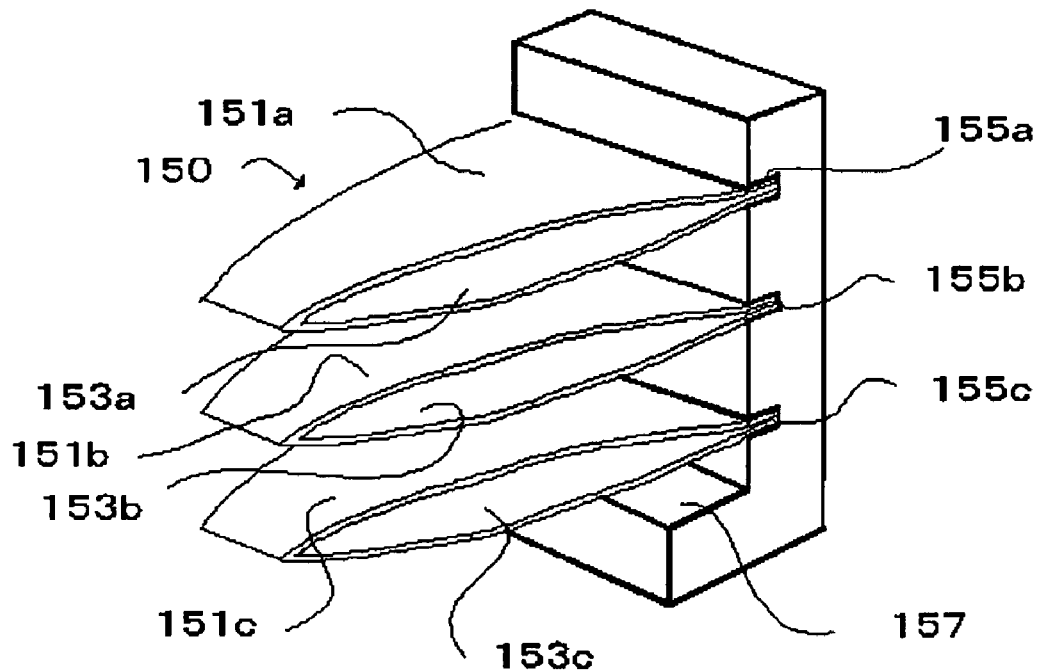
FIGS. 8(A) and 8(B) are sectional views of a charging filter according to a further embodiment of the present invention.
Figure 8:
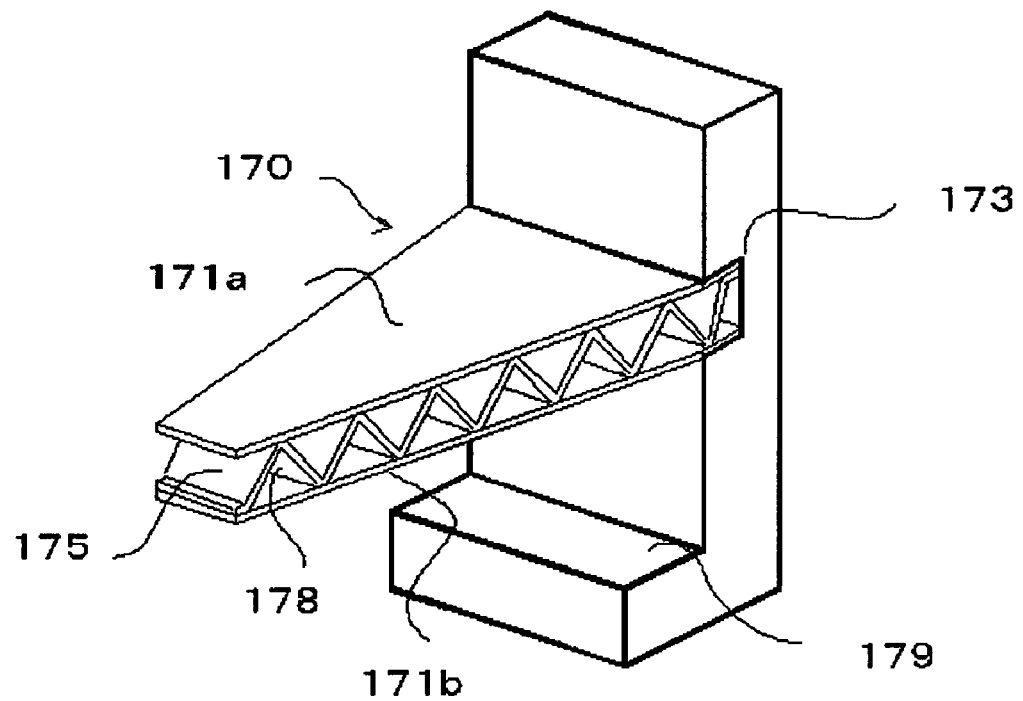

FIGS. 8(A) and 8(B) are perspective views of a charging filter having a cantilevered structure. In a charging filter 150 shown in FIG. 8(A), charged film, which electretized a polymeric film high in rigidity, is used as a filter medium instead of the foregoing fibrous electret filter medium. Both-face charged films 151a to 151c are each folded in two so that both ends overlap each other to form through holes 153a to 153c. The thus-overlapped ends are fixed as fixing portions 155a to 155c to a fixing member 157 in a cantilevered structure. In the charging filter 150, magnetic disks of a magnetic disk stack 16 comprising two stacked magnetic disks are sandwiched respectively in between the charged films 151a and 151b and in between the charged films 151b and 151c. Then, the fixing member 157 is secured to the side wall 13 of the base 12.

In comparison with the charging filter 100 having the pleat portion, the charging filter 150 is smaller in surface area and lower in dust collection efficiency. On the other hand, since charged films can be disposed at positions close to surfaces of the magnetic disks 16. The positions have a high air flow velocity and large amount of air. Therefore, the amount of air flowing through the through holes 153 per unit time is large and it is possible to enhance the dust collection efficiency. The charging filter 150 exhibits a flow uniforming function in addition to the dust collecting function. Since the charging films 151a to 151c are each disposed between vertically adjacent magnetic disks 16, a turbulent flow resulting from collision with AHSA 23 can be conducted toward the through holes 153 and be rendered uniform thereby. In this case, the fixing member 157 can be attached to the base side wall 13 for example in the corner space 15, which is surrounded with a corner of the disk enclosure shown in FIG. 2(B) and the outer peripheral portions of the magnetic disks 16. Since the surface of each charged film is smooth, dust particles once adhered to the film surface may leave the surface under the vigor of the air flow. In that case, it is preferable to apply a known adhesive to the film surface. A magnetic disk drive provided with dedicated flow uniforming blades having such a function is disclosed in Japanese Patent Laid-open No. 2001-023347.

A charging filter 170 shown in FIG. 8(B) has a cantilevered structure in which a fibrous electret filter medium 175 formed in a pleat shape is sandwiched in between a pair of flat plates 171a and 171b having rigidity. The pleat portion 175 has plural through holes 178. A fixing portion 173 of the sandwich structure comprising the plates 171a, 171b, and the electret filter medium 175 is supported by a fixing member 179. Alternatively, the fixing portion 173 may be fixed directly to the side wall 13 of the base. In comparison with the charging filter 150 shown in FIG. 8(A), the charging filter 170 shown in FIG. 8(B) can be enlarged in both surface area and rigidity. Unlike the charging filter shown in FIG. 8(A), it is not necessary for the filter medium itself to possess rigidity and therefore a suitable electret filter medium having a large charging quantity can be freely selected. A plurality of such sandwich structures are stacked to match the number of stacked magnetic disks 16. The structures are attached to the side wall 13 of the base as is the case with the charging filter 150. In this way, both dust collecting effect and flow uniforming effect can be exhibited at the same time.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A rotating disk storage device comprising:
a disk enclosure including a base and a cover;
a rotary disk storage medium supported rotatably by a spindle motor mounted to said base;
an actuator head suspension assembly with a head carried thereon, said head being adapted to access said rotary disk storage medium; and
a charging filter having through holes including a charged filter medium therearound and allowing an air flow to pass therethrough, wherein said charging filter is attached to a bottom of said base located outside a pivotal range of said actuator head suspension assembly, a projection plane of a contour of the filter overlapping the rotary disk storage medium, and wherein said charging filter is disposed in such a manner that said through holes face in a direction perpendicular to a projection plane of a radius of said rotary disk storage medium.

2. The rotating disk storage device according to claim 1, wherein said charging filter has a pleat portion formed with a plurality of said through holes.

3. The rotating disk storage device according to claim 2, wherein said pleat portion comprises a fibrous electret filter medium.

4. The rotating disk storage device according to claim 3, wherein said fibrous electret filter medium has at least two layers formed on inner and outer surface sides of said through holes, said two layers being different in charging quantity.

5. The rotating disk storage device according to claim 4, wherein the charging quantity of the outer surface-side layer of said fibrous electret filter medium is larger than the charging quantity of the inner surface-side layer.

6. The rotating disk storage device according to claim 4, wherein the inner surface-side layer of said electret filter medium is higher in rigidity than the outer surface-side layer.

7. The rotating disk storage device according to claim 2, wherein said charging filter has a liner portion formed of a fibrous electret filter medium, said liner portion forming said through holes together with said pleat portion.

8. The rotating disk storage device according to claim 7, further comprising a double-coated adhesive tape for fixing said liner portion to a bottom of said base.

9. The rotating disk storage device according to claim 1, wherein said through holes are formed in one stage.

10. The rotating disk storage device according to claim 1, wherein said charging filter has tube portions forming said through holes.

11. The rotating disk storage device according to claim 1, wherein said charging filter is attached to a side wall of said base.

12. The rotating disk storage device according to claim 1, wherein said charging filter is attached to said cover.

13. The rotating disk storage device according to claim 1, wherein said through holes are formed by an electretized film.

14. The rotating disk storage device according to claim 1, wherein said charging filter has a cantilevered structure.

15. A rotating disk storage device comprising:
a disk enclosure including a base and a cover;
a rotary disk storage medium supported rotatably by a spindle motor mounted to said base;
an actuator head suspension assembly with a head carried thereon, said head being adapted to access said rotary disk storage medium; and
a charging filter having through holes including a charged filter medium therearound to allow air flow to pass therethrough, wherein said charging filter is disposed at a position between said rotary disk storage medium and a bottom of said base outside of a pivotal range of said actuator head suspension assembly, a projection plane of a contour of the filter overlapping the rotary disk storage medium, wherein said charging filter is disposed in such a manner that said through holes face in a direction perpendicular to a projection plane of a radius of said rotary disk storage medium.

16. A rotating disk storage device comprising:

a disk enclosure including a base and a cover;

a rotary disk storage medium supported rotatably by a spindle motor mounted to said base;

an actuator head suspension assembly with a head carried thereon, said head being adapted to access said rotary disk storage medium; and a charging filter having through holes including a charged filter medium therearound to allow air flow to pass. therethrough, wherein said charging filter extends from a side wall of said base horizontally in parallel with a surface of said rotary disk storage medium, a projection plane of a contour of the filter overlapping the rotary disk storage medium, said charging filter disposed in such a manner that said through holes face in a direction perpendicular to a projection plane of a radius of said rotary disk storage medium.

17. The rotating disk storage device according to claim 16, wherein said charging filter has an electretized film.

18. The rotating disk storage device according to claim 16, wherein said charging filter has a support plate extending from the side wall of said base horizontally in parallel with the surface of said rotary disk storage medium and also has a fibrous electret filter medium supported by said support plate.

* * * * *